(12) United States Patent  
Etoh et al.

(10) Patent No.: US 7,160,825 B2
(45) Date of Patent: Jan. 9, 2007

(54) MACHINABLE CERAMIC (75) Inventors: Shunichi Etoh, Toyonaka (JP); Yasuki Yoshitomi, Higashiosaka (JP); Tadahisa Arahori, Ashiya (JP); Kuniaki Nakagawa, Matto (JP); Kazumasa Mori, Kanazawa (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 50 days.

(21) Appl. No.: 10/947,552

(22) Filed: Sep. 22, 2004

(65) Prior Publication Data

US 2005/0130829 A1 Jun. 16, 2005

(30) Foreign Application Priority Data

Sep. 25, 2003 (JP) ............................. 2003-333691

(51) Int. Cl.
 C04B 35/583 (2006.01)
 C04B 35/5835 (2006.01)
 C04B 35/488 (2006.01)

(52) U.S. Cl. ............... 501/96.4; 501/97.4; 501/103
(58) Field of Classification Search ............. 501/96.4, 501/97.4, 103, 104, 105
 See application file for complete search history.

(56) References Cited

U.S. PATENT DOCUMENTS

| 2,776,218 | A | | 1/1957 | Taylor |
| 4,642,298 | A | | 2/1987 | Kuramoto et al. |
| 5,043,304 | A | * | 8/1991 | Yoshida et al. ............ 501/96.4 |
| 5,083,687 | A | * | 1/1992 | Saito et al. ................. 222/591 |
| 5,132,245 | A | * | 7/1992 | Yoshido et al. ............ 501/96.4 |

FOREIGN PATENT DOCUMENTS

| EP | 0 423 793 | | 4/1991 |
| JP | 52-145418 | | 12/1977 |
| JP | 58-165056 | | 9/1983 |
| JP | 60-195059 | | 10/1985 |
| JP | 4-92868 | * | 4/1990 |
| JP | 03-268849 | | 11/1991 |
| JP | 04-118159 | | 4/1992 |
| JP | 2000-327402 | | 11/2000 |
| JP | 2001-354480 | * | 12/2001 |
| JP | 2003 286076 | | 10/2003 |
| WO | WO 92/12107 | | 7/1992 |

OTHER PUBLICATIONS

Translation of Japanese document 2003286076, publication date Jul. 10, 2003.*
Yongli et al., "Fabrication and Properties of Machinable TZP-BN-10%Si3N4 Ceramic Composites", Journal of Xi'an Jiaotong University, vol. 37, No. 5, May 2003 (abstract only, one page).

* cited by examiner

Primary Examiner—Karl E. Group
(74) Attorney, Agent, or Firm—The Webb Law Firm (57) ABSTRACT A high-strength machinable ceramic capable of high-precision fine machining has a coefficient of thermal expansion close to that of silicon and preferably a uniform blackish color which facilitates image processing of machined parts. The ceramic comprises a main constituent and a sintering aid. The main constituent comprises 30–59.95 mass % of boron nitride, 40–69.95 mass % of zirconia, optionally up to 20 mass % of silicon nitride and 0.05–2.5 mass % (calculated as an element) of at least one coloring additive, which is selected from C, Si, elements of Groups IIIA–IVB in the fourth period, elements of Groups IVA–VB in the fifth period, elements of Groups IVA–VIB in the sixth period of the long form periodic table, and compounds of these elements.

18 Claims, 2 Drawing Sheets

MACHINABLE CERAMIC

TECHNICAL FIELD

The present invention relates to a machinable ceramic and particularly to a high-strength machinable ceramic which can be uniformly colored so as to have low optical reflectivity and which has a coefficient of thermal expansion which can be controlled to be in a desired range depending on the intended use. The present invention also relates to a method for the production of such a machinable ceramic and a machined part, such as a probe guide, which is manufactured from such a ceramic by machining such as cutting, grinding, and/or drilling.

BACKGROUND ART

In general, ceramics have excellent mechanical and electrically insulating properties as well as excellent high-temperature characteristics, and they have attracted attention as materials for use as parts of equipment for manufacturing semiconductors. Due to a large amount of shrinkage during sintering to produce a ceramic, such parts must be manufactured from a sintered body by machining such as grinding in order to provide a desired shape and dimensions with high accuracy. However, most ceramics are difficult to machine.

Machinability of a ceramic can be improved by incorporating a cleavable ceramic component such as mica or boron nitride which is dispersed in the ceramic or, in the case of a crystallized glass ceramic, in its glass matrix. This type of ceramics are generally referred to as machinable ceramics. In view of their good machinability, they are often used to manufacture some parts of semiconductor inspection equipment, which must have good insulating properties and be capable of undergoing fine machining with high precision.

However, there are few materials which have the combination of high strength and excellent machinability required for high-precision fine machining along with a coefficient of thermal expansion close to that of silicon. In addition, the color of conventional machinable ceramics is not uniform, and thus they have a poor appearance which reduces the value of a commercial product made from the materials. Moreover, these ceramics have a white or pale color with high reflectivity, which prevents accurate inspection and measurement by image processing of machined parts formed from the ceramics.

The electrical characteristics of semiconductor elements such IC's and LSI's are typically inspected using a probe card, which has a large number of probes for inspection. Inspection is carried out by bringing all the probes of the probe card into contact with the electrode pads of a semiconductor element simultaneously.

Figure 1A:
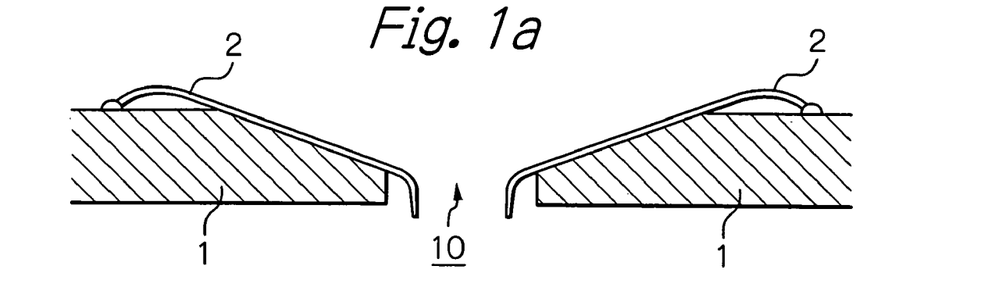
FIG. 1a is a schematic vertical cross section of a conventional probe card.

FIG. 1a is a schematic vertical cross-sectional view of a probe card having inspecting probes for use in inspecting a semiconductor element. A probe card 1 formed from an insulating material such as a ceramic has at approximately its center an opening 10 having dimensions which are nearly the same or larger than those of a semiconductor element to be inspected. The opening 10 is normally flared upwards as illustrated. Inspecting probes 2 which are equal in number to the electrode pads formed on the semiconductor element are secured to the top surface of the probe card 1 by an adhesive, for example.

The inspecting probes 2 are normally made of a conducting metallic material. The tips of the probes 2, which are bent into roughly the shape of an L, slightly protrude from the lower surface of the probe card 1 through the opening 10 so as to arranged with the same pattern as the electrode pads of the semiconductor element. Although not illustrated, the other ends of the probes 2 are electrically connected by solder or the like to an electrically conducting circuit formed on the top surface of the probe card 1. In order to prevent the probes 2 from contacting each other, the periphery of each probe 2 except for its tip may be covered with a heat resisting resin or similar material.

The electrical properties of a semiconductor element (not shown) are inspected by placing the probe card 1 atop the semiconductor element to be inspected and pressing down the probe card 1 so that the tips of the inspecting probes 2 protruding through the opening 10 contact the electrode pads of the semiconductor element. In order to accurately perform inspection, it is essential for all of the large number of inspecting probes to simultaneously contact the electrode pads of the semiconductor element disposed beneath it with certainty. However, the probes are normally made of a slender metallic material, so they easily bend when the probe card 1 is pressed downwards, and due to the bending, it is easy for the positions of the tips of the probes 2 to slip. As a result, it is difficult for the probes 2 to contact the electrode pads with certainty.

Figure 1B:
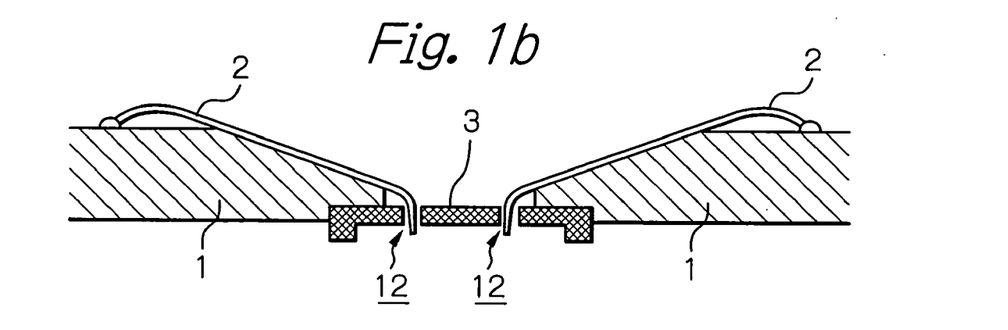
FIG. 1b is a schematic vertical cross section of a probe card equipped with a probe guide having through holes through which probes extend.

As shown in FIG. 1b, in order to make it easy to accurately align the inspecting probes 2 with the electrode pads of a semiconductor element, a probe guide 3 formed from an insulating plate can be fitted into the opening 10 of the probe card 1 so as to block the opening 10. The probe guide 3 has through holes 12, through which the probes 2 pass so that the tips of the probes 2 project from the lower surface of the probe guide 3. The through holes 12 are arranged with the same pattern as the electrode pads. The probe guide 3 serves to limit lateral movement of the probes 2 due to bending and allows the probes 2 to contact the electrode pads more accurately.

The through holes 12, which have a somewhat larger diameter than the inspecting probes 2, are formed in the probe guide 3 with the same pitch as the electrode pads. In recent LSI's, which are achieving significantly higher mounting densities, it is not unusual for the pitch of electrode pads to be 100 micrometers or smaller.

Figure 1C:
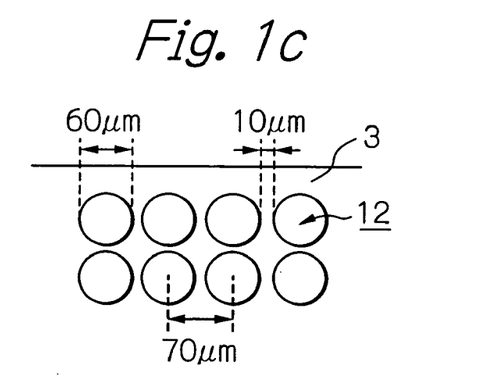
FIG. 1c is a plan view showing the arrangement of through holes in a probe guide.
Figure 1D:
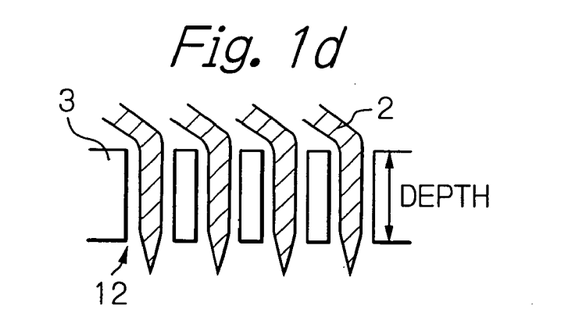
FIG. 1d is a schematic vertical cross-sectional view of the probe guide of FIG. 1c.

For example, as shown in a plan view and a cross-sectional view in FIG. 1c and FIG. 1d, respectively, when the pitch of electrode pads is 70 micrometers, if the diameter of each through hole 12 is 60 micrometers, the wall thickness between adjoining through holes (the minimum distance between holes) becomes an extremely small value of 10 micrometers. Thus, it is necessary to form such small-diameter, thin-walled through holes must be formed with high accuracy in a probe guide by means of drilling, for example.

Figure 2:
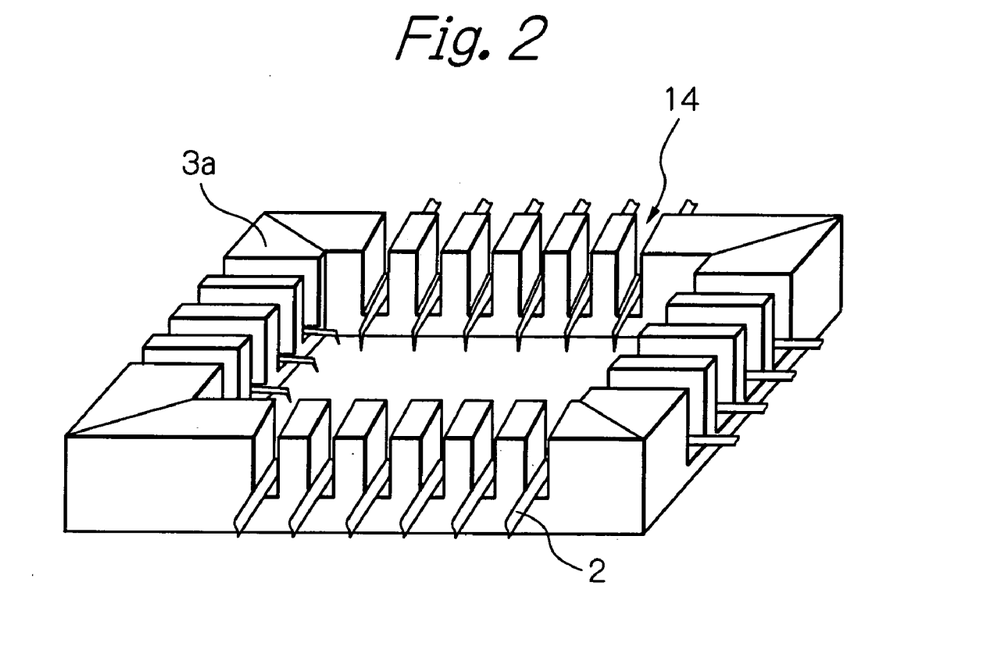
FIG. 2 is a schematic perspective view of a different type of a probe guide which is frame-shaped and has slits on each side for receiving probes.

A different type of a probe guide is shown in a perspective view in FIG. 2. In FIG. 2, a frame-shaped probe guide 3a, which may be either an integral insulating part or assembled from insulating panels, have vertical slits 14 on at least one side member, usually two or four side members, of the frame with the same pitch as the electrode pads of a semiconductor element to be inspected (not shown). The probe guide 3a may be fitted into the opening of a probe card (not shown) by inserting it into the opening of the probe card from below so that each probe 2 of the probe card extends through the corresponding slit 14. Again, lateral movement of the probes 2 is limited by the slits of the probe guide, and they can be made to more accurately contact the electrode pads.

Figure 3:
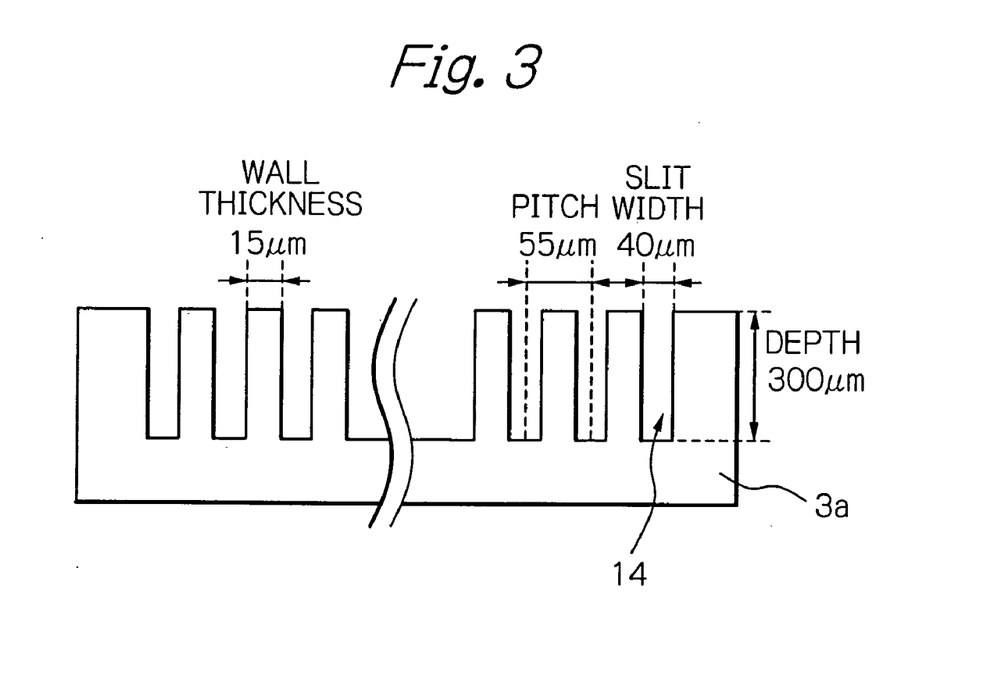
FIG. 3 is a schematic vertical cross-sectional view of one side member of the frame-shaped probe guide shown in FIG. 2.

FIG. 3 is a schematic cross section of one side member of a frame-shaped probe guide 3a having slits 14 as shown in FIG. 2. As illustrated, the shape of slits 14 are generally defined by the depth and width of each slit and the wall thickness which is the distance between adjacent slits. The slits of a probe guide are usually deep and fine with a thin wall thickness. For example, as shown in FIG. 3, slits 14 may have a depth of 300 micrometers and a width of 40 micrometers with a wall thickness of 15 micrometers. Such slits are generally formed by grinding using a grindstone and/or grinding wheel.

Naturally, a probe guide needs to be electrically insulating in order to prevent short circuits between inspecting probes. It is necessary for its volume resistivity to be at least $1.0 \times 10^{10}$ Ω·cm.

Conventional probe guides were made of plastic or a machinable crystallized glass ceramic comprising $Al_2O_3$, $SiO_2$, and $K_2O$. In recent years, they may be made from a boron nitride-containing machinable ceramic.

A plastic probe guide generally cannot be used for inspection at a high temperature. In addition, it is not possible to achieve sufficient dimensional accuracy of through holes or slits to inspect semiconductor elements of higher densities with smaller pitches of electrode pads.

A probe guide made from a crystallized glass ceramic is capable of performing high temperature inspection. However, the coefficient of thermal expansion of a crystallized glass ceramic is large compared to that of a semiconductor element, and depending upon the inspection temperature, positional deviation may occur between inspecting probes and the electrode pads of a semiconductor element being inspected.

In addition, the strength of a crystallized glass ceramic is not so high that chipping and cracking easily take place during drilling or other machining, and an adequate dimensional accuracy cannot be obtained. See JP-A 58-165056 (1983).

Furthermore, a conventional crystallized glass ceramic is white. Therefore, when image processing is carried out in order to inspect the dimensions of tiny through holes or slits formed in a probe guide or to perform positioning of a probe guide on a probe card, light is easily reflected from the ceramic surface of the probe guide, thereby making it difficult to obtain an accurate image. In addition, due to the white color, dirt on exterior of the ceramic easily stands out and decreases the value of a product manufactured from the ceramic. See JP-A 58-165056 (1983).

A composite ceramic material comprising aluminum nitride and boron nitride has a coefficient of thermal expansion which is close to that of silicon. Therefore, when using a probe guide made of such a material, positional deviations caused by thermal expansion are small. However, the machinability of this material is poor, so it is not suitable for high precision fine machining. In addition, it has an irregular coloring which reduces the value of a product made from it. See JP-A 60-195059 (1985).

A high-strength machinable silicon nitride/boron nitride composite ceramic material has been proposed, but its coefficient of thermal expansion is small compared to that of silicon. Thus, when it is used in a jig for inspecting semiconductors such as a probe guide, depending upon the inspection temperature, positional deviations easily occur. See JP-A 2000-327402.

Accordingly, there still remains a need for a high-strength machinable ceramic capable of being processed by fine machining with high precision and which can be uniformly colored so as to have low optical reflectivity and has a coefficient of thermal expansion which is close to that of silicon.

SUMMARY OF THE INVENTION

The present invention provides a high-strength machinable ceramic having a strength of 240 MPa. It also has good machinability, when tested by machining for 5 minutes with a cemented carbide tool of K-10 type, as measured by a width of flank wear land (VB) of at most 0.2 mm and a surface roughness Rmax of the machined surface of at most 5 micrometers. Such a high-strength machinable ceramic allows to perform fine or high-precision machining on a micron level. It has a coefficient of thermal expansion which can be controlled to be close to that of silicon and can be uniformly colored to have a blackish color of low reflectivity.

In one embodiment of the present invention, a high-strength machinable ceramic comprises a main constituent and a sintering aid, wherein the main constituent comprises 30–60 mass % of boron nitride, 40–70 mass % of zirconia, and 0–20 mass % of silicon nitride. Preferably, the ceramic has a coefficient of thermal expansion of $3$–$5 \times 10^{-6}$/° C., which is close to that of silicon, in the temperature range of 25–600° C.

Zirconia has three crystal forms, a monoclinic, a tetragonal, and a cubic forms with increasing temperatures. The normal form of zirconia at room temperature is monoclinic. In order to avoid the formation of cracks due to the expansion or shrinkage in volume caused by crystal transformation, a zirconia ceramic is normally used in the form of a stabilized zirconia which has the tetragonal form or the cubic form or both at room temperature. Such stabilized zirconia includes a fully stabilized zirconia (FSZ, cubic form), a partially stabilized zirconia (PSZ, cubic and tetragonal forms), and tetragonal zirconia polycrystals (TZP, tetragonal form). In general, PSZ and TZP have greater toughness than FSZ.

In order to achieve both high strength and free machinability in a ceramic according to the present invention, it is desirable that the zirconia have primarily the cubic form like FSZ, which is relatively easy to machine compared to PSZ or TZP.

An electrically insulating material which has a uniform blackish color and a coefficient of thermal expansion close to silicon is effective for use in probe guides and similar equipment.

In another embodiment of the present invention, a high-strength machinable ceramic comprises a main constituent and a sintering aid, wherein the main constituent comprises 30–59.95 mass % of boron nitride, 40–69.95 mass % of zirconia, 0–20 mass % of silicon nitride, and wherein the ceramic has a blackish color. Again, the ceramic preferably has a coefficient of thermal expansion of $3$–$5 \times 10^{-6}$/° C. in the temperature range of 25–600° C.

The blackish color of the ceramic can be provided by incorporating a coloring additive in the main constituent of the ceramic. The coloring additive is at least one element selected from C, Si, elements of Groups IIIA–IVB in the fourth period, elements of Groups IVA–VB in the fifth period, and elements of Groups IVA–VIB in the sixth period of the long form periodic table. These elements may be present either in its elemental form or in a compound form. The total amount of the coloring additive is 0.05–2.5 mass % as element based on the main constituent of the ceramic.

The term "main constituent" used herein refers to the solid particles constituting the body of a ceramic, and it does not include a sintering aid. The main constituent of a ceramic according to the present invention is a combination of boron nitride, zirconia, and optionally silicon nitride and a coloring additive.

The term "sintering aid" used herein refers to a material which forms a liquid phase during sintering and promotes sintering. At the completion of sintering, it remains in an amorphous state in the boundaries of the main constituent grains, and a portion thereof may volatilize during sintering.

The machinable ceramic according to the present invention can be produced by a process which includes mixing the main constituent which comprises boron nitride, zirconia, and Optionally silicon nitride and at least one coloring additive or their precursors with 1–15 mass % of a sintering aid based on main constituent to obtain a raw material powder, and sintering the raw material powder at a high temperature under pressure. A machined part such as a probe guide can be manufactured from the ceramic by machining which may include cutting and grinding to form slits and/or drilling to form through holes.

DETAILED DESCRIPTION OF THE INVENTION

A ceramic according to the present invention can be used to manufacture the following novel ceramic machined parts (1) and (2) each having a coefficient of thermal expansion of $3-5 \times 10^{-6}/°$ C. in the temperature range of 25–600° C., which is close to that of silicon, along with a uniform blackish color:

(1) a ceramic machined part having a plurality of slits formed by grinding in which the thickness of the walls formed between adjoining slits is at least 5 micrometers and less than 20 micrometers, the ratio of the slit depth to the wall thickness is at least 15, and the accuracy of the pitch of slits is at most ±4 micrometers; and (2) a ceramic machined part having a plurality of holes formed by drilling in which the hole diameter is at most 65 micrometers, the minimum distance between the holes (wall thickness) is at least 5 micrometers and less than 20 micrometers, the ratio of the hole depth to the wall thickness is at least 15, and the accuracy of the hole diameter and the hole pitch are each at most ±4 micrometers.

An example of a ceramic machined part is a probe guide having a plurality of slits and/or holes through which probes for inspecting a semiconductor element can be passed.

Such a machined part can be manufactured by a process which includes preparing a raw material powder for sintering which comprises raw materials of a main constituent (including boron nitride, zirconia, and optionally silicon nitride and a coloring additive) and a suitable sintering aid, sintering the raw material powder at a high temperature under pressure using a hot press or HIP, for example, to produce a ceramic sintered body, and machining the ceramic sintered body by grinding and/or drilling.

The boron nitride and zirconia in the raw material powder preferably have an average particle diameter of less than 1 micrometer. Boron nitride provides the resulting ceramic with high thermal conductivity in addition to its inherent good machinability, and these two properties in combination impart excellent machinability to the ceramic. Zirconia has high strength but its coefficient of thermal expansion is higher than that of silicon. Silicon nitride is an optional ingredient, and its coefficient of thermal expansion is lower than that of silicon, and it has high strength.

Thus, the coefficient of thermal expansion of the ceramic can be controlled by adjusting the amounts of zirconia, boron nitride, and silicon nitride which are added to the raw material powder. The addition of silicon nitride also serves to improve the strength of the ceramic.

The coloring additive is at least one element selected from C, Si, elements of Groups IIIA–IVB in the fourth period, elements of Groups IVA–VB in the fifth period, and elements of Groups IVA–VIB in the sixth period of the long form periodic table. Each of these elements may be used either in elemental form or in the form of a compound such as a nitride, a carbide, a boride, an oxide, a silicide, an acid hydrate, an nitrate, a carbonate, an acetate, or a sulfate. The coloring additive does not include compounds present in the main constituent. A ceramic having a uniform blackish color with a low reflectivity cannot be produced only by boron nitride and zirconia.

The raw material of a coloring additive may undergo reaction by heating before sintering and/or during sintering. Thus, the raw material may be a precursor of the coloring additive which is present in a sintered ceramic. For example, an organic resin may be used as a precursor of C, or a metal salt can be used as a precursor of a metal oxide. Particularly in the latter case, the raw material powder may be calcined in air or another oxidizing atmosphere in order to convert the metal salt or other precursor to a metal oxide before sintering. Such calcination may be performed either before or after addition of a sintering aid.

C and Si can be added in the form of elemental carbon or silicon or in the form of silicon carbide. In other cases, when they are included as a metal carbide or silicide, they are treated as a carbide or silicide of the metal element.

Examples of elements of Groups IIIA–IVB in the fourth period are Sc, Ti, V, Cr, Mn, Fe, Co, Ni, Cu, Zn, Ga, and Ge. Examples of elements of Groups IVA–VB in the fifth period are Zr, Nb, Mo, Tc, Ru, Rh, Pd, Ag, Cd, In, Sn, and Sb. Examples of elements of Groups IVA–VIB in the sixth period are Hf, Ta, W, Re, Os, Ir, Pt, Au, Hg, Ti, Pb, Bi, and Po.

Of these elements, a transition element such as Sc, Ti, V, Cr, Mn, Fe, Co, Ni, Cu, Zn, Mo, or W in elemental form and/or as an oxide is preferable. When such a transition element or its oxide is added as a coloring additive, particularly the oxide is reduced into its metal or a lower valence oxide during sintering, thereby causing blackening and allowing the resulting ceramic sintered body to have a particularly uniform blackish color. Furthermore, metal oxides are generally less hard than metal nitrides, carbides, or borides and less adversely affect the machinability of the ceramic.

Ti is particularly suitable as a coloring element, since the addition of Ti in elemental form and/or as an oxide produces a particularly uniform coloring in which irregular colors do not stand out, and it has a minimal effect on machinability.

The addition of C (carbon) is also preferred because it has a minimal effect on machinability. Carbon is preferably used in the form of a carbon powder or a carbonizable resin. When a carbonizable resin is used, its amount can be adjusted so as to obtain a desired content after carbonization.

A ceramic according to the present invention has a high strength of at least 240 MPa, and it has good machinability. Therefore, it can be subjected to high-precision fine machining. It has a coefficient of thermal expansion of $3-5 \times 10^{-6}/°$C. in the temperature range of 25–600° C., which is close to the coefficient of thermal expansion of $4 \times 10^{-6}/°$ C. of silicon. As a result, when it is used as a material of a probe guide in a semiconductor inspection apparatus, it does not produce positional deviations with respect to the semiconductor element being inspected even if there is a change in temperature. Therefore, an inspection apparatus for semiconductor elements which can be effectively used with high-density LSI's can be realized.

A ceramic according to the present invention can be colored to a uniform blackish color, so measurement or inspection of a machined part by image processing can be accurately carried out. Furthermore, it has an excellent appearance so that the value of a product formed from the ceramic is increased.

In order to color ceramic machined parts, it is conceivable to coat the machined parts by vapor deposition with a metal or ceramic by coating with a resin. However, these simple coating methods have a number of problems. For example, a coated film can easily peel off, the coated film itself has a thickness on the order of 10 micrometers, and it is easy for the film thickness to become nonuniform, so it is difficult to maintain the dimensional accuracy of a machined part. Therefore, it is preferable to color the ceramic material itself.

If the amount of the coloring additive which is added is too small, a sintered body having a uniform color with low reflectivity cannot be obtained. On the other hand, if the amount of the coloring additive is too high, the strength of the sintered body decreases and its machinability deteriorates, so its ability to undergo fine machining is impaired. In addition, the insulating properties of the ceramic also worsen, and when it is used as a probe guide for a semiconductor inspection apparatus, problems such as short circuits between adjoining probes can occur.

In the present invention, a blackish color having low reflectivity includes black, gray, dark blue, dark purple, dark green, and similar colors. More specifically, the blackish color is defined as a Munsell value of at most 8.5 in the Munsell color system (a color system using three factors of color specified in JIS Z8721).

In an embodiment of the present invention, a raw material powder for sintering is prepared by adding a sintering aid to a powder of the main constituent which comprises 30–60 mass % of boron nitride, 40–70 mass % of zirconia, and 0–20 mass % of silicon nitride.

In another embodiment of the present invention in which a ceramic is colored with a coloring additive, a raw material powder for sintering is prepared by adding a sintering aid to a powder of the main constituent which comprises 30–59.95 mass % of boron nitride, 40–69.95 mass % of zirconia, 0–20 mass % of silicon nitride, and a coloring additive.

The components of the raw material powder can be throughly mixed with each other using a suitable device such as a wet ball mill.

The boron nitride may be a hexagonal type (h-BN). In order to obtain a high strength required for fine machining, the raw material powder of the main constituent and particularly boron nitride powder preferably has an average particle diameter of less than 1 micrometer. Likewise, zirconia powder and, if used, silicon nitride powder preferably have an average particle diameter of less than 1 micrometer and more preferably less than 0.5 micrometers in order to obtain a desired high-strength machinable ceramic.

The sintering aid used in the present invention can be selected from those conventionally used in the sintering of boron nitride or silicon nitride. A preferred sintering aid is one or more of aluminum oxide (alumina), magnesium oxide (magnesia), yttrium oxide (yttria), oxides of lanthanoid metals, and compound oxides such as spinel. More preferably it is a mixture of alumina and yttria, or a mixture of alumina, yttria, and magnesia.

The amount of the sintering aid which is added to the main constituent raw material powder is 1–15 mass % and preferably in the range of 3–10 mass % of the main constituent raw material powder. If the amount of the sintering aid is too small, adequate sintering cannot be performed and the strength of the sintered body decreases. If the amount of the sintering aid is too large, a grain boundary glass phase having low strength is formed in an increased amount, thereby leading to a decrease in the strength of the sintered body.

When the raw material powder is calcined in order to convert a metal salt as a precursor of the coloring additive into a metal oxide after a sintering aid has been added thereto, the powder may normally be agglomerated during calcination, so the resulting calcined powder is subjected again to wet ball milling for deagglomeration.

The raw material powder, which is a powder mixture of the main constituent and the sintering aid, is sintered at a high temperature under pressure. One method for sintering at a high temperature under pressure is hot pressing, which may be carried out in a nitrogen atmosphere or in a pressurized nitrogen atmosphere. A suitable range for the hot pressing temperature is 1400–1800° C. If the sintering temperature is too low, sintering is inadequate, and if it is too high, problems such as effluence of molten sintering aid may occur. A suitable pressure is in the range of 20–50 MPa. The length of time for which hot pressing is performed depends upon the temperature and dimensions of the sintered body to be formed, but normally it is around 1–4 hours.

High temperature pressurized sintering can also be carried out by HIP (hot isostatic pressing). The sintering conditions for HIP can also be suitably selected by a person skilled in the art.

The resulting sintered body may have a uniform blackish color if a coloring additive is present therein. Its coefficient of thermal expansion can be made in the range of $3-5 \times 10^{-6}/°$ C. for the temperature range of 25–600° C. by suitably selecting the type and amount of a sintering aid and the proportions of zirconia and silicon nitride (if added).

Observation of the microstructure of a sintered ceramic according to the present invention under a scanning electron microscope (SEM) revealed that all the boron nitride, zirconia, and optional ingredients of silicon nitride and a coloring additive, which constitute the main constituent of the ceramic, had an average grain diameter of at most 5 micrometers.

The sintered ceramic has excellent machinability and a high strength, and it can be machined to form fine slits or through holes with high accuracy. Therefore, it is suitable for use to manufacture a probe guide having fine slits or through holes with a thin wall thickness, the probe guide being used in a semiconductor inspection apparatus. The coefficient of thermal expansion of the probe guide can be controlled to be close to that of silicon in order to prevent positional deviation between inspecting probes and the electrode pads of a semiconductor element being inspected even when temperature variations are experienced. In addition, it may have a uniform blackish color with a low reflectivity by inclusion of a coloring additive in the main constituent. As a result, inspection and positioning of the probe guide by image processing can be accurately carried without the need for special treatment such as vapor deposition or coating after machining. Such treatment decreases the dimensional accuracy of a machined part. In addition, it has an excellent uniform appearance, and its value as a commercial product is high.

A ceramic machined part such as a probe guide according to the present invention may be in the general form of a plate or frame as shown in FIG. 1b and FIG. 2. It has a plurality of slits formed by grinding and/or a plurality of through holes formed by drilling. The outer shape of a probe guide may be decided to fit into the opening of a probe card to which the probe guide is attached.

The thickness of the wall between slits or through holes is very small, such as at least 5 micrometers and less than 20 micrometers, and a desired wall thickness can be achieved with good accuracy. Therefore, when a machined part according to the present invention is used as a probe guide, the positions of inspecting probes can be maintained with high accuracy, the accuracy of alignment between probes and electrode pads of a semiconductor element being inspected is increased, and the reliability of an inspection apparatus employing the probe guide is increased.

Although there are no particular limits on the uses of a high-strength machinable ceramic which is manufactured in this manner and which may have a uniform blackish color and a coefficient of thermal expansion which is close to that of silicon, it is useful as a probe guide which is attached to a probe card for use in the inspection of semiconductor elements.

EXAMPLES

The following examples illustrate the present invention with no intention of limiting it. In the following description, unless otherwise specified, % means mass % and parts means parts by mass.

Examples 1–8

Powder of hexagonal boron nitride (h-BN) with an average particle diameter of 0.9 micrometers and a purity of 99%, zirconia powder with an average particle diameter of 0.1 micrometers, and optionally silicon nitride powder with an average particle diameter of 0.1 micrometers were mixed in the proportions shown in Table 1 to prepare a main constituent raw material powder. A sintering aid consisting of 2% of alumina and 6% of yttria based on the main constituent raw material powder was added to the main constituent raw material powder and mixed therewith in a wet ball mill using ethyl alcohol as a solvent. The ball mill had a polyethylene pot, and zirconia balls were used as a mixing medium. The resulting slurry was dried in a vacuum evaporator to obtain a raw material powder.

A graphite die was filled with the raw material powder, and hot press sintering was carried out at 1600° C. for 2 hours while applying a pressure of 30 MPa in a nitrogen atmosphere to obtain a ceramic sintered body measuring 65×65 mm with a thickness of 10 mm.

A test piece was cut from the sintered body, and the fracture strength of the test piece was measured with a three-point bending test. The fracture strength is indicated as the bending strength in Table 1.

In order to evaluate machinability, a machining test was carried out on the sintered body by grinding with a K-10 type cemented carbide tool at a grinding speed of 18 m/min and a feed speed of 0.03 mm/rev and with a cutting depth of 0.1 mm. After 5 minutes, the surface roughness of the machined material and the width of flank wear land of the tool (indicating the extent of wear of the tool) were measured.

In addition, the coefficient of thermal expansion of the sintered body was measured in the temperature range from room temperature (25° C.) to 600° C.

Using a grinding wheel (resin bonded diamond grindstone #200, thickness of 40 micrometers, outer diameter of 50 mm), 100 slits having the shape shown in FIG. 3 (width of 40 micrometers, wall thickness of 15 micrometers, depth of 300 micrometers, and pitch of 55 micrometers) were formed in the sintered body. In the column labeled "slits" in Table 1, X indicates that slits could not be formed, Δ indicates that slit could be formed but the accuracy of the slits was inadequate (the pitch accuracy exceeded ±4 micrometers) or cracks and/or chipping occurred, and ○ indicates that slits could be formed with sufficient accuracy and that there was no occurrence of cracking or chipping.

In another machining test, a thin plate with a thickness of 300 micrometers was cut from the sintered body, and 20 rows of through holes (a total of 200 holes) like those shown in FIGS. 1c and 1d having a wall thickness of 10 micrometers and a pitch of 70 micrometers were formed in the plate using a cemented carbide drill (made of SKH9) with a diameter of 50 micrometers. Each hole had a diameter of 60 micrometers and a depth of 300 micrometers.

The accuracy of the hole diameter and the hole pitch of the resulting through holes was measured. In the column labeled "holes" in Table 1, ○ indicates that the accuracy was at most ±4 micrometers and there was no cracking or chipping, Δ indicates that holes could be formed but the accuracy of the holes was insufficient or there was the occurrence of cracking or chipping, and X indicates that holes could not be formed.

The results are shown in Table 1.

Example 9

Powder of hexagonal boron nitride (h-BN) having an average particle diameter of 0.9 micrometers and a purity of 99%, and zirconia powder having an average particle diameter of 0.8 micrometers were mixed in the proportions shown in Table 1. A sintered body was prepared and the resulting sintered body was tested in the same manner as described in Examples 1–8. The results are also shown in Table 1. A decrease in bending strength compared to the previous examples was observed.

Comparative Example 1

A sintered body was prepared in the same manner as in Examples 1–9 except that the mass ratios of boron nitride, zirconia, and silicon nitride were outside the ranges for the present invention.

Comparative Example 2

Slit formation and hole formation were carried out on a conventional machinable crystallized glass ceramic material in the same manner as in the examples. The strength of the material was low, chipping occurred during fine machining, and hole formation could not be accurately carried out. The various properties and results of machining of this conventional machinable ceramic material are shown in Table 1.

Comparative Example 3

Slit formation and hole formation were carried out in the same manner as in the examples on a conventional machinable ceramic material comprising a composite of aluminum nitride and boron nitride. The machinability of the material was poor, and holes could not be formed with good accuracy. The various properties and results of machining of this ceramic material are shown in Table 1.

X indicates that measurement could not be smoothly carried out due to reflection of light. In addition, the color of the ground surface of each sintered body was evaluated for the Munsell color value specified in the Munsell color system (JIS Z 8721) by comparing the color with a standard color chart.

The results are shown in Table 2 along with the proportions of boron nitride, zirconia, and silicon nitride.

The coloring additive used to prepare a main constituent raw material powder in each example was as follows and it was added in an amount to provide the proportion of the element shown in Table 2.

Examples 10–11: carbon powder having an average particle diameter of 0.1 micrometers;

Example 12: a phenolic resin in an amount sufficient to provide the proportion of C shown in Table 2 after carbonization;

Example 13: molybdic acid ($H_2MoO_4$);

TABLE 1

| No.[1] | Main constituent (parts) Boron nitride (BN) | Zirconia ($ZrO_2$) | Silicon nitride ($Si_3N_4$) | Mean Particle Diameter (μm) BN | $ZrO_2$ | Crystal phase of zirconia Cubic | Tetragonal | Machinability VB[2] (mm) | Rmax of machined surface (μm) | Bending strength (MPa) | Coefficient of thermal expansion $\times 10^{-6}/°C$ | Results of machining Hole | Slit |
|---|---|---|---|---|---|---|---|---|---|---|---|---|---|
| Ex. 1 | 30 | 70 | — | 0.9 | 0.1 | ○ | — | 0.05 | 4.8 | 481 | 4.8 | ○ | ○ |
| Ex. 2 | 45 | 55 | — | 0.9 | 0.1 | ○ | — | 0 | 3.9 | 353 | 3.3 | ○ | ○ |
| Ex. 3 | 50 | 50 | — | 0.9 | 0.1 | ○ | — | 0 | 3.2 | 304 | 3.1 | ○ | ○ |
| Ex. 4 | 30 | 60 | 10 | 0.9 | 0.1 | ○ | — | 0.08 | 4.7 | 500 | 4.3 | ○ | ○ |
| Ex. 5 | 37 | 53 | 10 | 0.9 | 0.1 | ○ | — | 0.01 | 3.9 | 481 | 4.1 | ○ | ○ |
| Ex. 6 | 40 | 50 | 10 | 0.9 | 0.1 | ○ | — | 0.01 | 4.0 | 451 | 3.8 | ○ | ○ |
| Ex. 7 | 35 | 50 | 5 | 0.9 | 0.1 | ○ | — | 0.01 | 3.6 | 481 | 3 | ○ | ○ |
| Ex. 8 | 38 | 60 | 2 | 0.9 | 0.1 | ○ | — | 0 | 3.9 | 461 | 3.6 | ○ | ○ |
| Ex. 9 | 50 | 50 | — | 0.9 | 0.8 | ○ | — | 0.02 | 3.6 | 284 | 3.2 | ○ | ○ |
| Com. 1 | 20 | 60 | 20 | 0.9 | 0.1 | ○ | — | 0.23 | 5.5 | 520 | 4.4 | Δ | Δ |
| Com. 2 | Mica-based glass ceramics | | | | | | | 0.04 | 5.0 | 147 | 7.8 | X | Δ |
| Com. 3 | Aluminum nitride/boron nitride composite ceramics | | | | | | | 0.464 | 6.2 | 363 | 4.6 | X | Δ |

[1]Ex = Example; Com. = Comparative Example;
[2]VB = Width of flank wear land

Examples 10–33

In these examples, ceramic sintered bodies were produced and tested in the same manner as described in the foregoing examples except that a coloring additive was added to a main constituent raw material powder, which was then mixed with a sintering aid.

In addition to the machinability (width of flank wear land and roughness of machined surface), bending strength (fracture strength), coefficient of thermal expansion, and machining results in slit and hole formation, each being tested and evaluated as described above, the quality of color of each sintered body was tested and evaluated in the following manner, and its volume resistivity at room temperature was also measured.

Quality of color was evaluated by visual observation after removal by grinding of the surface layer of a sintered body measuring 65 mm×65 mm. In the column labeled "uniformity" in Table 1, ○ indicates that coloring was achieved with no irregularities, and X indicates that there was irregularity in the color. Color tone was also evaluated. In the column labeled "color tone" in Table 1, ○ indicates that image processing measurement of a machined shape (hole shape, hole position, etc.) could be smoothly carried out, and Examples 14–17: titanium oxide ($TiO_2$);
Example 18: titanium carbide (TiC);
Example 19: titanium nitride (TiN);
Example 20: titanium boride ($TiB_2$);
Example 21: tungsten carbide (WC);
Example 22: basic cobalt (II) carbonate*;
Example 23: nickel powder having an average particle diameter of 0.1 micrometers and a purity of 99.9%;
Example 24: manganese (II) acetate tetrahydrate*;
Example 25: copper (II) nitrate trihydrate*;
Example 26: silver (I) oxide ($Ag_2O$);
Example 27: scandium oxide ($Sc_2O_3$);
Example 28: vanadium oxide ($V_2O_5$);
Example 29: zinc oxide (ZnO);
Example 30: gallium (III) oxide ($Ga_2O_3$);
Example 31: iron (III) nitrate nanohydrate;
Example 32: chromium oxide ($Cr_2O_3$); and
Example 33: tin (II) oxide (SnO).

*In Examples 22, 24, 25, and 31, the coloring agents were precursors in the form of metal salts, i.e, basic cobalt (II) carbonate, manganese (II) acetate tetrahydrate, copper (II) nitrate trihydrate, and iron (III) nitrate nanohydrate, respectively. In those examples, the mixed main constituent raw material powder was mixed with the sintering aid by wet ball milling in the same manner as described in Example 1. The resulting raw material powders were then calcined in air 400° C. to decompose the salts into their respective oxides, i.e., cobalt oxide, manganese oxide, copper oxide, and iron oxide, respectively, and the calcined powders were further subjected to wet ball milling for deagglomeration before they were used to produce ceramic sintered bodies and test them in the same manner as described in Example 1.

Comparative Examples 4–6

For comparison, a sintered body was prepared and evaluated in the same manner as in Examples 10–33 except that the mass ratios of boron nitride, zirconia, silicon nitride, and a coloring additive were outside the ranges for the present invention. The results are shown in Table 2.

TABLE 2

| No.[1] | Main Constituents other than coloring additive (parts) BN | ZrO₂ | Si₃N₄ | Mean particle diameter (μm) BN | ZrO₂ | Coloring additive Element | Mass %[2] | Machinability VB[3] (mm) | Rmax of machined surface (μm) | B.S.[4] (MPa) | Coefficient of thermal expansion ×10⁻⁶/° C. | Results of machining Hole | Slit | Results of coloring[5] A | B | C | Volume resistivity Ω·m |
|---|---|---|---|---|---|---|---|---|---|---|---|---|---|---|---|---|---|
| Ex. 10 | 30 | 69.95 | 0 | 0.9 | 0.1 | C | 0.05 | 0.08 | 4.5 | 470 | 4.8 | ○ | ○ | ○ | ○ | 8.5 | 8.9 × 10¹³ |
| Ex. 11 | 39 | 55 | 5 | 0.9 | 0.1 | C | 1.0 | 0.03 | 3.7 | 443 | 3.8 | ○ | ○ | ○ | ○ | 3.5 | 3.6 × 10¹² |
| Ex. 12 | 43 | 55 | 0 | 0.9 | 0.1 | C | 2.0 | 0.08 | 4.4 | 298 | 3.6 | ○ | ○ | ○ | ○ | 2.5 | 5.8 × 10¹⁰ |
| Ex. 13 | 49 | 50 | 0 | 0.9 | 0.1 | Mo | 1.0 | 0.06 | 3.8 | 289 | 3.1 | ○ | ○ | ○ | ○ | 4.0 | 8.5 × 10¹² |
| Ex. 14 | 30 | 59 | 10 | 0.9 | 0.1 | Ti | 1.0 | 0.05 | 4.0 | 491 | 4.3 | ○ | ○ | ○ | ○ | 3.5 | 1.5 × 10¹³ |
| Ex. 15 | 39 | 55 | 5 | 0.9 | 0.1 | Ti | 1.0 | 0.03 | 3.8 | 431 | 3.2 | ○ | ○ | ○ | ○ | 4.0 | 3.6 × 10¹² |
| Ex. 16 | 39 | 40 | 20 | 0.9 | 0.1 | Ti | 1.0 | 0.05 | 4.0 | 478 | 3.3 | ○ | ○ | ○ | ○ | 3.0 | 4.6 × 10¹² |
| Ex. 17 | 59.95 | 40 | 0 | 0.9 | 0.1 | Ti | 0.05 | 0.02 | 3.6 | 310 | 3.2 | ○ | ○ | ○ | ○ | 8.5 | 1.2 × 10¹³ |
| Ex. 18 | 49 | 50 | 0 | 0.9 | 0.8 | Ti | 1.0 | 0.09 | 3.9 | 258 | 3.2 | ○ | ○ | ○ | ○ | 4.0 | 5.5 × 10¹¹ |
| Ex. 19 | 37 | 53 | 7.5 | 0.9 | 0.1 | Ti | 2.5 | 0.17 | 4.6 | 388 | 4.5 | ○ | ○ | ○ | ○ | 2.0 | 4.1 × 10¹⁰ |
| Ex. 20 | 49.95 | 50 | 0 | 0.9 | 0.8 | Ti | 0.05 | 0.08 | 3.9 | 270 | 3.3 | ○ | ○ | ○ | ○ | 8.5 | 1.5 × 10¹² |
| Ex. 21 | 39.95 | 50 | 10 | 0.9 | 0.1 | W | 0.05 | 0.01 | 4.0 | 451 | 3.8 | ○ | ○ | ○ | ○ | 8.0 | 1.7 × 10¹⁴ |
| Ex. 22 | 39 | 55 | 5 | 0.9 | 0.1 | Co | 1.0 | 0.06 | 4.0 | 445 | 3.1 | ○ | ○ | ○ | ○ | 4.0 | 1.0 × 10¹² |
| Ex. 23 | 39 | 55 | 5 | 0.9 | 0.1 | Ni | 1.0 | 0.05 | 4.0 | 432 | 3.1 | ○ | ○ | ○ | ○ | 4.0 | 3.7 × 10¹² |
| Ex. 24 | 40 | 55 | 3.5 | 0.9 | 0.1 | Mn | 1.5 | 0.06 | 3.8 | 421 | 3.2 | ○ | ○ | ○ | ○ | 2.0 | 9.1 × 10¹¹ |
| Ex. 25 | 39 | 55 | 5 | 0.9 | 0.1 | Cu | 1.0 | 0.06 | 4.0 | 445 | 3.1 | ○ | ○ | ○ | ○ | 3.5 | 1.0 × 10¹² |
| Ex. 26 | 39 | 55 | 5 | 0.9 | 0.1 | Ag | 1.0 | 0.05 | 4.0 | 448 | 3.1 | ○ | ○ | ○ | ○ | 4.0 | 3.7 × 10¹² |
| Ex. 27 | 39 | 55 | 5 | 0.9 | 0.1 | Sc | 1.0 | 0.06 | 4.3 | 430 | 3.2 | ○ | ○ | ○ | ○ | 4.0 | 5.0 × 10¹² |
| Ex. 28 | 39 | 55 | 5 | 0.9 | 0.1 | V | 1.0 | 0.07 | 4.1 | 425 | 3.0 | ○ | ○ | ○ | ○ | 3.5 | 8.0 × 10¹² |
| Ex. 29 | 39 | 55 | 5 | 0.9 | 0.1 | Zn | 1.0 | 0.06 | 4.1 | 441 | 3.1 | ○ | ○ | ○ | ○ | 3.5 | 3.1 × 10¹² |
| Ex. 30 | 39 | 55 | 5 | 0.9 | 0.1 | Ga | 1.0 | 0.05 | 4.0 | 429 | 3.1 | ○ | ○ | ○ | ○ | 3.5 | 6.7 × 10¹² |
| Ex. 31 | 40 | 55.5 | 3.5 | 0.9 | 0.1 | Fe | 1.0 | 0.06 | 3.8 | 439 | 3.2 | ○ | ○ | ○ | ○ | 3.5 | 9.1 × 10¹¹ |
| Ex. 32 | 30 | 59 | 10 | 0.9 | 0.1 | Cr | 1.0 | 0.11 | 4.8 | 491 | 4.3 | ○ | ○ | ○ | ○ | 3.0 | 1.5 × 10¹³ |
| Ex. 33 | 37 | 60 | 2 | 0.9 | 0.1 | Sn | 1.0 | 0.07 | 3.9 | 448 | 3.6 | ○ | ○ | ○ | ○ | 3.5 | 1.3 × 10¹² |
| Com. 4 | 20 | 60 | 20 | 0.9 | 0.1 | — | 0 | 0.23 | 5.5 | 520 | 4.4 | X | Δ | X | X | 8.5 | 3.9 × 10¹⁴ |
| Com. 5 | 59 | 35 | 5 | 0.9 | 0.1 | Mo | 1.0 | 0.01 | 3.1 | 157 | 1.9 | Δ | X | ○ | ○ | 3.5 | 1.5 × 10¹³ |
| Com. 6 | 47 | 50 | 0 | 0.9 | 0.1 | Mo | 3.0 | 0.25 | 5.1 | 231 | 3.7 | X | Δ | ○ | ○ | 2.0 | 9.8 × 10⁸ |

[1]Ex = Example, Com. = Comparative Example;
[2]Mass % as element;
[3]VB = Width of flank wear land;
[4]B.S. = Bending strength;
[5]A: Color tone, B: Uniformity, C: Munsell color value

What is claimed is:

1. A machinable ceramic comprising a main constituent and a sintering aid, wherein the main constituent comprises 30–60 mass % of hexagonal boron nitride, 40–70 mass % of zirconia, and 0–20 mass % of silicon nitride, the ceramic having a strength of 240 MPa.

2. A machinable ceramic as claimed in claim 1 having a coefficient of thermal expansion of $3-5\times10^{-6}/°$ C. in the temperature range of 25–600° C.

3. A method of manufacturing a machinable ceramic comprising the steps of mixing a main constituent raw material powder which comprises 30–60 mass % of hexagonal boron nitride and 40–70 mass % of zirconia with a sintering aid in an amount of 1–15 mass % based on the main constituent raw material powder to obtain a raw material powder, and sintering the raw material powder at a high temperature under pressure to obtain a sintered body.

4. A method as claimed in claim 3 wherein the main constituent raw material powder further comprises 0–20 mass % of silicon nitride.

5. A method of manufacturing a machinable ceramic as claimed in claim 4 wherein the zirconia has an average particle diameter of less than 1 micrometer.

6. A probe guide made of a machinable ceramic comprising a main constituent and a sintering aid, wherein the main constituent comprises 30–60 mass % of boron nitride, 40–70 mass % of zirconia, and 0–20 mass % of silicon nitride, the probe guide having a plurality of minute vacancies made by machining and having a form selected from slits and holes through which probes can pass.

7. A machinable ceramic as claimed in claim 1, wherein the main constituent comprises 30–59.95 mass % of boron nitride, 40–69.95 mass % of zirconia, and 0–20 mass % of silicon nitride and wherein the ceramic has a blackish color.

8. A machinable ceramic as claimed in claim 7 wherein the main constituent further includes greater than 0 mass % of silicon nitride.

9. A probe guide comprising a blackish-colored machinable ceramic comprising a main constituent and a sintering aid, wherein the main constituent comprises 30–59.95 mass % of boron nitride, 40–69.96 mass % of zirconia, and 0–20 mass % of silicon nitride and wherein the ceramic has a blackish color, the probe guide having a plurality of minute vacancies made by machining and having a form selected from slits and holes through which probes can pass.

10. A machinable ceramic comprising a main constituent and a sintering aid, wherein the main constituent comprises 30–59.95 mass % of hexagonal boron nitride, 40–69.95 mass % of zirconia, 0–20 mass % of silicon nitride, and 0.05–2.5 mass % (calculated as an element) of at least one coloring additive selected from the group consisting of C, Si, elements of Groups IIIA–IVB in the fourth period, elements of Groups IVA–VB in the fifth period, elements of Groups IVA–VIB in the sixth period of the long form periodic table, and compounds of these elements.

11. A machinable ceramic as claimed in claim 10 having a coefficient of thermal expansion of $3-5 \times 10^{-6}/°$ C. in a temperature range of 25–600° C.

12. A machinable ceramic comprising a main constituent and a sintering aid, wherein the main constituent comprises 30–59.95 mass % of boron nitride, 40–69.95 mass % of zirconia, 0–20 mass % of silicon nitride, and 0.05–2.5 mass % (calculated as an element) of at least one coloring additive selected from the group consisting of Sc, Ti, V, Cr, Mn, Fe, Co, Ni, Cu, Zn, Mo, W metals and oxides of these metals.

13. A method of manufacturing a machinable ceramic comprising a main constituent and a sintering aid, wherein the main constituent comprises 30–59.95 mass % of boron nitride, 40–69.95 mass % of zirconia, and 0.05–2.5 mass % (calculated as an element) of at least one coloring additive selected from the group consisting of C, Si, elements of Groups IIIA–VIB in the fourth period, elements of Groups IVA–VB in the fifth period, elements of Groups IVA–VIB in the sixth period of the long form periodic table, and compounds of these elements including the steps of mixing a main constituent raw material powder comprising boron nitride, zirconia, and at least one coloring additive with a sintering aid in an amount of 1–15 mass % based on the main constituent raw material powder to obtain a raw material powder, and sintering the raw material powder at a high temperature under pressure to obtain a sintered body.

14. A method as claimed in claim 13 wherein the main constituent raw material powder further comprises 0–20 mass % of silicon nitride.

15. A probe guide comprising a machinable ceramic comprising a main constituent and a sintering aid, wherein the main constituent comprises 30–59.95 mass % of boron nitride, 40–69.95 mass % of zirconia, 0–20 mass % of silicon nitride, and 0.05–2.5 mass % (calculated as an element) of at least one coloring additive selected from the group consisting of C, Si, elements of Groups IIIA–IVB in the fourth period, elements of Groups IVA–VB in the fifth period, elements of Groups IVA–VIB in the sixth period of the long form periodic table, and compounds of these elements, the probe guide having a plurality of minute vacancies made by machining and having a shape selected from slits and holes through which probes can pass.

16. A probe guide comprising a machinable ceramic as claimed in claim 12 having a plurality of minute vacancies made by machining and having a shape selected from slits and holes through which probes can pass.

17. A machinable ceramic as claimed in claim 10, wherein the coloring additive is selected from the group consisting of elements of Groups IIIA–IVB in the fourth period, elements of Groups IVA–VB in the fifth period, elements of Groups IVA–VIB in the sixth period of the long form periodic table, and compounds of these elements.

18. A method as claimed in claim 3, wherein the sintered body has a strength of at least 240 MPa.

* * * * *

UNITED STATES PATENT AND TRADEMARK OFFICE
CERTIFICATE OF CORRECTION

PATENT NO. : 7,160,825 B2
APPLICATION NO. : 10/947552
DATED : January 9, 2007
INVENTOR(S) : Etoh et al.

Page 1 of 1

It is certified that error appears in the above-identified patent and that said Letters Patent is hereby corrected as shown below:

Column 13, Line 63, Claim 2, "of thennal expansion" should read --of thermal expansion--

Signed and Sealed this

Fourth Day of March, 2008

JON W. DUDAS
*Director of the United States Patent and Trademark Office*